(12) United States Patent
Fukashiro et al.

(10) Patent No.: US 7,848,646 B2
(45) Date of Patent: Dec. 7, 2010

(54) OPTICAL, NETWORK, NODE APPARATUS AND METHOD FOR RECOVERY PATH FAULT

(75) Inventors: Yasuyuki Fukashiro, Yokohama (JP); Tooru Hirai, Yokohama (JP)

(73) Assignee: Hitachi, Ltd., Tokyo (JP)

( * ) Notice: Subject to any disclaimer, the term of this patent is extended or adjusted under 35 U.S.C. 154(b) by 1041 days.

(21) Appl. No.: 11/491,072

(22) Filed: Jul. 24, 2006

(65) Prior Publication Data

US 2007/0036544 A1    Feb. 15, 2007

(30) Foreign Application Priority Data

Jul. 25, 2005    (JP) .............................. 2005-213728

(51) Int. Cl.
*H04B 10/08* (2006.01)
*G02F 1/00* (2006.01)
(52) U.S. Cl. ................................ 398/19; 398/12; 398/5
(58) Field of Classification Search .................... 398/19, 398/12, 5, 4, 3
See application file for complete search history.

(56) References Cited

U.S. PATENT DOCUMENTS

| 6,735,392 | B1 * | 5/2004 | Elahmadi et al. ............... 398/7 |
| 6,862,380 | B2 * | 3/2005 | Chaudhuri et al. ............ 385/17 |
| 7,289,728 | B2 * | 10/2007 | Wang et al. ..................... 398/5 |
| 7,302,177 | B2 * | 11/2007 | Moriyama .................... 398/19 |
| 7,340,163 | B2 * | 3/2008 | Hardee .......................... 398/4 |
| 7,424,220 | B2 * | 9/2008 | Miyazaki ...................... 398/19 |

FOREIGN PATENT DOCUMENTS

| CN | 2641926 Y | 9/2004 |
| JP | 2003-218912 | 7/2003 |
| JP | 2003-258851 | 9/2003 |
| JP | 2003-258851 | * 12/2003 |
| JP | 2005-027144 | 1/2005 |

OTHER PUBLICATIONS

L. Berger, "Generalized Multi-Protocol Label switching (GMPLS) Signaling Functional Description", Jan. 2003, IETF.
P. Ashwood-Smith et al., "Generalized Multi-Protocol Label switching (GMPLS) Signaling Constraint-based Routed Label Distribution Protocol 9CD-LDP) Extensions", Jan. 2003, IETF.
L. Berger, "Generalized Multi-Protocol Label switching (GMPLS) Signaling Resource Reservation Protocol-Traffic Engineering (RSVP-TE) Extensions", Jan. 2003, IETF.
Itu, "Interfaces for the Optical Transport Network (OTN)", Itu-t, g.709/y.1331, Mar. 2003.
Chinese Office Action dated Sep. 25, 2009; 4 pages.
Japanese Office Action dated May 18, 2010 for Application No. 2005-213728.

* cited by examiner

*Primary Examiner*—M. R. Sedighian
(74) *Attorney, Agent, or Firm*—Antonelli, Terry, Stout & Kraus, LLP.

(57) ABSTRACT

Normality of links on a spare path or the links and nodes is monitored. When the spare path cannot be used, at least any one of nodes at both ends in a segmented path section is changed to another node on a working path. The segmented path section is changed to set another spare path. When a fault monitoring section which can accumulatively detect abnormal information is changed to the changed partial working path section, alarm generation in the fault monitoring section is prevented to release the prevention after completion of the change.

8 Claims, 8 Drawing Sheets

PATH INFORMATION 210

| PATH ID 211 | START NODE 212 | END NODE 213 |
|---|---|---|
| 00000001 | A | F |

SEGMENTED PATH INFORMATION 220

| SEGMENTED PATH ID 221 | START NODE 222 | END NODE 223 | RELAY NODE 224 | PERFORMANCE MONITORING 225 | SEGMENTED PATH STATUS 226 | NUMBER OF SPARE PATHS 227 |
|---|---|---|---|---|---|---|
| s0001 | A | B | – | ON | ACTIVE | 1 |
| s0002 | B | D | C | ON→OFF | ACTIVE→STANDBY | 1 |
| s0003 | D | F | E | ON→OFF | ACTIVE→STANDBY | 1 |
| s0004 | B | E | C,D | OFF→ON | STANDBY→ACTIVE | 1 |
| s0005 | E | F | – | OFF→ON | STANDBY→ACTIVE | 1 |

SPARE PATH INFORMATION 230

| SEGMENTED PATH ID | SPARE PATH ID 231 | RELAY NODE 232 | PRIORITY ORDER 233 | PERFORMANCE MONITORING 234 | SPARE PATH STATUS 235 |
|---|---|---|---|---|---|
| s0001 | s0001.001 | G,H | 1 | OFF | STANDBY |
| s0002 | s0002.001 | H,I,J | 1 | OFF | STANDBY→FAULT |
| s0003 | s0003.001 | J,K,L | 1 | OFF | STANDBY→FAULT |
| s0004 | s0004.001 | H,I,J,K | 1 | OFF | DEACTIVE→STANDBY |
| s0005 | s0005.001 | K,L | 1 | OFF | STANDBY→STANDBY |

PATH INFORMATION

| PATH ID | START NODE | END NODE |
|---|---|---|
| 00000001 | A | F |

SEGMENTED PATH INFORMATION

| SEGMENTED PATH ID | START NODE | END NODE | RELAY NODE | PERFORMANCE MONITORING | SEGMENTED PATH STATUS | NUMBER OF SPARE PATHS |
|---|---|---|---|---|---|---|
| s0001 | A | B | – | ON | ACTIVE | 1 |
| s0002 | B | D | C | ON | ACTIVE→FAULT | 1 |
| s0003 | D | F | E | ON | ACTIVE | 1 |
| s0004 | B | E | C,D | OFF | STANDBY | 1 |
| s0005 | E | F | – | OFF | STANDBY | 1 |

SPARE PATH INFORMATION

| SEGMENTED PATH ID | SPARE PATH ID | RELAY NODE | PRIORITY ORDER | PERFORMANCE MONITORING | SPARE PATH STATUS |
|---|---|---|---|---|---|
| s0001 | s0001.001 | G,H | 1 | OFF | STANDBY |
| s0002 | s0002.001 | H,I,J | 1 | OFF→ON | STANDBY→ACTIVE |
| s0003 | s0003.001 | J,K,L | 1 | OFF | STANDBY |
| s0004 | s0004.001 | H,I,J,K | 1 | OFF | DEACTIVE |
| s0005 | s0005.001 | K,L | 1 | OFF | DEACTIVE |

OPTICAL, NETWORK, NODE APPARATUS AND METHOD FOR RECOVERY PATH FAULT

CLAIM OF PRIORITY

The present application claims priority from Japanese patent application serial no. 2005-213728, filed on Jul. 25, 2005, the content of which is hereby incorporated by reference into this application.

BACKGROUND OF THE INVENTION

The present invention relates to an optical network, a node apparatus, and a method for relieving a path fault. More specifically, the present invention relates to an optical network, a node apparatus, and a method for relieving a path fault, which use performance monitoring and alarm transfer for relieving a fault.

A sharp increase in data traffic typified by the Internet in recent years is making the transmission capacity of a communication network larger. At present, optical transmission is advancing, intending to increase its capacity using a time division multiplexing technique or an optical wavelength division multiplexing technique. A transmitter of 10 gigabits per second for one channel has been practically used. There has also been practically used a point-to-point wavelength multiplexing transmission apparatus which performs wavelength-multiplexing for several channels to several tens of channels by one fiber and uses optical amplifiers and regeneration repeaters to permit long distance transmission exceeding several hundred kilometers.

To respond to future demand increase, further economization, and service diversity, a ring optical network which ring-connects connection nodes and a mesh optical network which mesh-connects them to increase connectivity are being studied. Such optical networks are used together with a monitoring control system which remotely and integrally manages node apparatuses, thereby expected to facilitate end-to-end path management from the start point to the end point of a line and to make path setting faster. The control units of node apparatuses are in conjunction with each other, thereby expected to facilitate end-to-end path management from the start point to the end point of a line and to make path setting faster. The mesh optical network can select a necessary line when the spare capacity in a mesh network is required. The spare capacity can be shared between plural working paths to economically realize the entire network.

To realize the mesh optical network, an optical signal switching apparatus and an optical cross connect apparatus which can switch, an optical signal such as STM-64/OC-192 and 10 GbE and perform path switching and switching to a stand-by system are being developed. The optical cross connect apparatus can switch the connection between transmission paths connected to a node or the connection relation between a transmission path and a user device in an distribution control method or a centralized and remote control method. An O-E-O (optic-electronic-optic) type optical cross connect system which uses light as optical input/output and performs signal processing by an electric signal performs processing by an electronic circuit in a transmission unit, for instance, in an STS-1 unit finer than STM-64 or OC-192. Efficient signal switching can be done.

An O-O-O type optical cross connect system which performs switching using an optical switch without converting an optical signal to an electric signal is expected to process a large amount of information difficult to be realized by an electronic circuit, for the increased amount of node processing information.

As an example of a circuit recovery method in the mesh optical network, Document 1 describes a method of dividing an optical path into segmented paths having plural nodes and at least one link to perform efficient circuit recovery using the optical cross connect system.

As a distributed control method in which network element control units communicate with each other to perform network status information exchange and path calculation, a network management system can be omitted or simplified. As such inter-node communication control technique, the Internet engineering task force (IETF) can use a signaling protocol of GMPLS (generalized multi-protocol label switching) defined by RFC shown in Documents 2 to 4.

Document 5 describes tandem connection monitoring (TCM) which can accumulatively perform performance monitoring by the bit interleaved parity (BIP) operation of a signal across plural nodes.

[Document 1] Japanese Patent Laid-Open No. 258851/2003

[Document 2] L. Berger, "Generalized Multi-Protocol Label switching (GMPLS) Signaling Functional Description", January, 2003, IETF

[Document 3] P. Ashwood-Smith et al, "Generalized Multi-Protocol Label switching (GMPLS) Signaling Constraint-based Routed Label Distribution Protocol (CR-LDP) Extensions", January, 2003, IETF

[Document 4] L. Berger, "Generalized Multi-Protocol Label switching (GMPLS) Signaling Resource Reservation Protocol-Traffic Engineering (RSVP-TE) Extensions", January, 2003, IETF

[Document 5] ITU, "Interfaces for the Optical Transport Network (OTN)", ITU-T, G.709/Y.1331, March, 2003

There are faults other than cable disconnection, for instance, (1) deterioration of an optical signal-to-noise ratio due to an increase in transmission path loss, noise of an optical amplifier, and a nonlinear effect in a transmission path fiber, (2) signal quality deterioration observed as a bit error due to waveform deterioration of chromatic dispersion and polarization mode dispersion of a transmission path fiber, and (3) a fault of a switching node. Due to such faults, there are the following problems in switching to a spare path executed by the mesh optical network. In the description of Document 1, a node has a switching function to a spare path, and when a preliminary resource connected to the node is shared between working paths and been has already used for recovering a fault on the working path (exhaustion of the preliminary resource) and a fault occurs on the spare path (the spare path is abnormal), another switching node is specified to perform spare path re-calculation for recovery on another spare path to reset a fault detection section. A specific procedure before and after resetting the fault detection section has not been clarified.

Here, assume that a working path section in which a fault occurs is switched to a spare path shared between plural working paths or currently-used segmented paths. In this case, to reduce processing of spare path recalculation or re-search on a working path or a currently-used segmented path in which no fault occurs, when the working path section in which a fault occurs becomes normal, returning the spare path to the original path, that is, switching-back is effective. Document 1 has not considered switching-back. The normality recovery check of the path in which a fault occurs is difficult.

SUMMARY OF THE INVENTION

To solve the above problems, a fault monitoring section is provided for each switching section, and when a spare path expected by the switching section exhausts a preliminary resource or is abnormal, the switching section, the spare path, and the fault monitoring section are changed. At change of the fault monitoring section, alarm generation on the reception side of the original fault monitoring section is prevented to set the transmission side, and the transmission side of the changed fault monitoring section is set to set the reception side. After these are completed, prevention of monitoring of the changed fault monitoring section is released. At switching to a spare path upon fault occurrence, the fault monitoring section on the spare path is set, and the fault monitoring section of a switching section in which a fault occurs is maintained. The normally recovered switching section can be rapidly checked to facilitate judgment of switching-back.

BRIEF DESCRIPTION OF THE DRAWINGS

Preferred embodiments of the present invention will now be described in conjunction with the accompanying drawings, in which:

FIGS. 7A and 7B are diagrams of assistance in explaining change of a path table due to spare path abnormality of FIGS. 5A and 5B and due to working path abnormality of FIG. 6A, respectively.

DESCRIPTION OF THE PREFERRED EMBODIMENTS

Embodiments of the present invention will be described below in detail with reference to the drawings.

Figure 1:
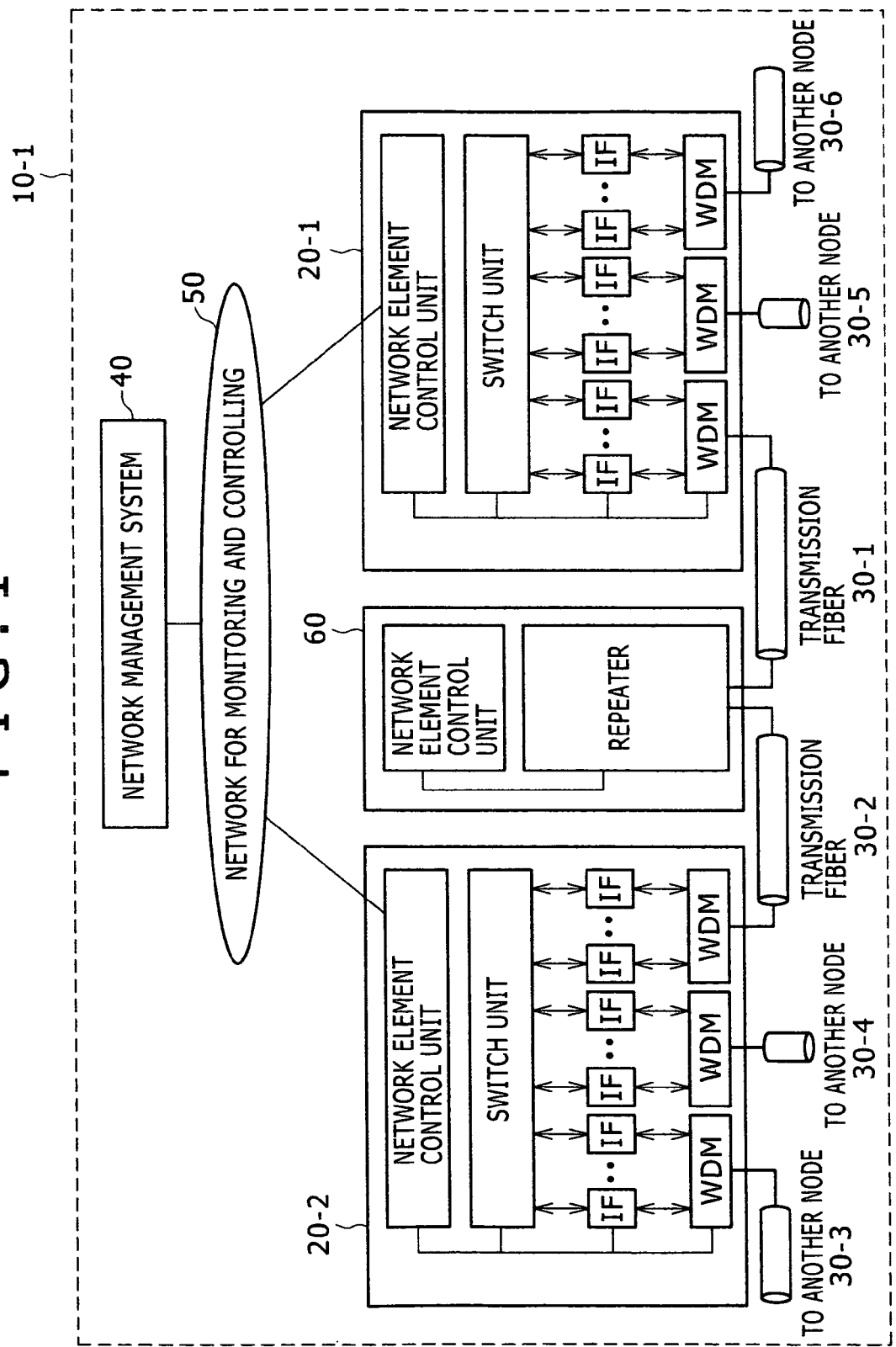
FIG. 1 is a block diagram of an optical network.

Using FIG. 1, an optical network to which a circuit recovery method is applied will be described. FIG. 1 is a block diagram of an optical network. In FIG. 1, an optical network 10 has nodes 20, transmission paths 30 connecting the nodes, a network management system 40, a monitoring controlling network 50 for transmitting and receiving a monitoring control signal between the network management system and the nodes, and a repeater 60 located between the nodes.

The network management system 40 executes network configuration management, fault management, bandwidth management, performance management, and security management. To secure a communication bandwidth between any nodes according to demand, the network management sysytem 40 selects a necessary number of IF units usable by the corresponding node with reference to configuration management information and fault management information and a path in which no fault occurs, and controls switch units of plural nodes including the corresponding node to set a communication path or a path. The relay 60 performing as a regeneration repeater or a linear amplification repeater for extending a transmission distance is located between the nodes 20. The relay 60 is located at each suitable distance according to the transmission distance so that plural relays 60 are located between the nodes. The regeneration repeater of the relay 60 converts an optical signal propagated on a transmission line to an electric signal to perform waveform shaping and digital quality monitoring, that is, bit error monitoring by BIP. The linear repeater amplifies wavelength multiplexed signals together by an optical fiber amplifier using an erbium-doped fiber. The linear repeater may be an optical semiconductor amplifier.

The relay 60 having the function of extending a transmission distance may be an optical 2R (reshaping, retiming) or optical 3R (reshaping, retiming, regeneration) relay which uses a nonlinear effect in a fiber or semiconductor to provide an improving effect of waveform shaping and a signal-to-noise ratio without converting an optical signal to an electric signal. The relay 60 may branch and insert only a desired line of plural lines. A device performing the above-described branch and insertion without converting an optical signal to an electric signal is called OADM (optical add drop multiplexer).

The network management system 40 may be a concentration control method by one or redundant server.

Figure 2:
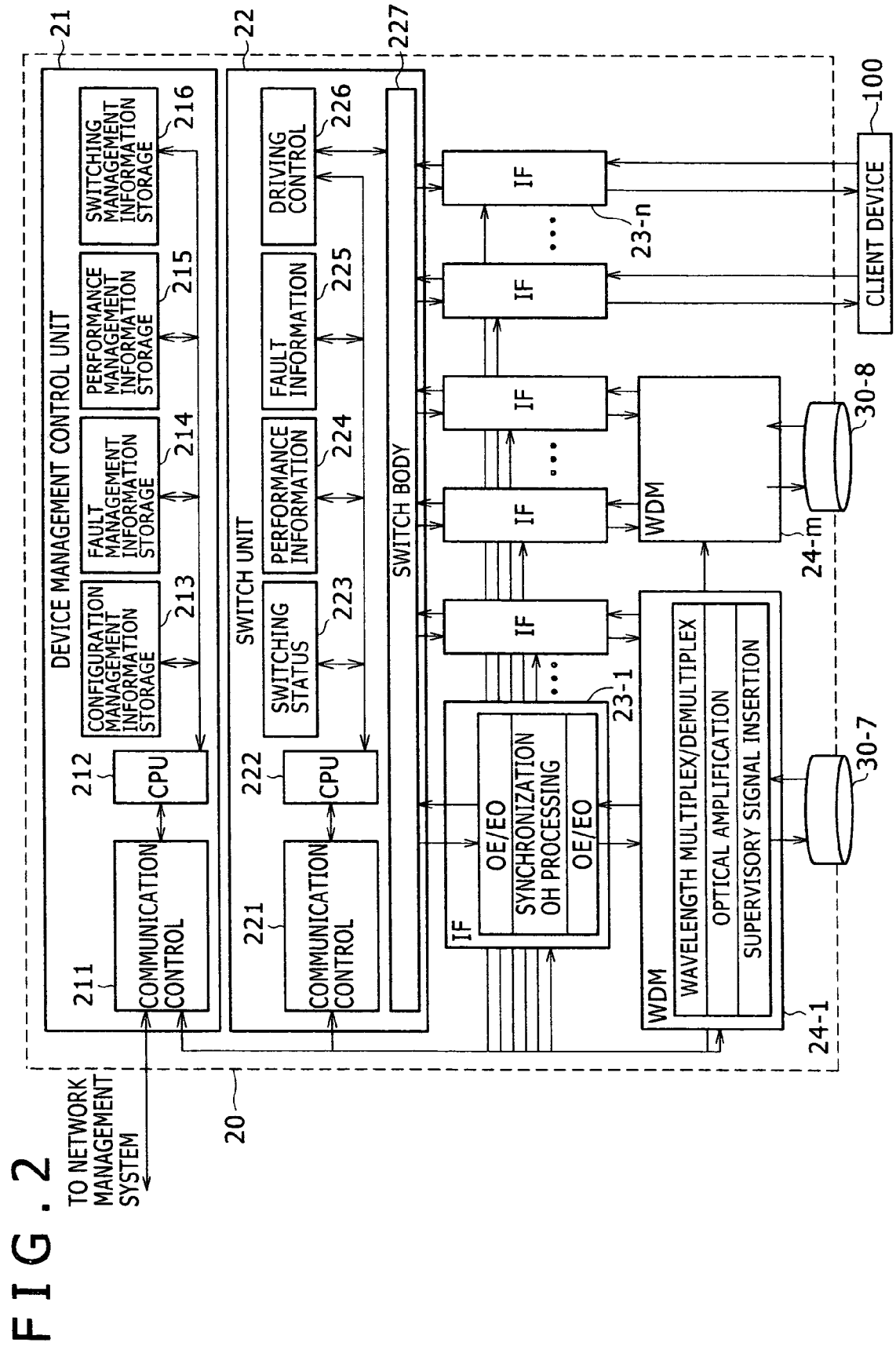
FIG. 2 is a node function block diagram.

The detailed configuration of the node will be described using FIG. 2. FIG. 2 is a node function block diagram. The node 20 has a device monitoring control unit 21, a switch unit 22 switching main signals, plural IF units 23 monitoring main signal quality using overhead processing and BIP and converting wavelengths outputted to transmission paths, and plural WDM units 24 wavelength-multiplexing outputs of the plural IF units for transmission to transmission path fibers. The IF unit 23 performs error correction code processing to compensate for quality deterioration due to other factors such as transmission distance extension, fiber seasonal variation, loss fluctuation due to a physical external force, and aged deterioration of components. The IF unit 23 accommodates a signal from a client device 100 using STM (synchronous transport module)-64 (10 Gbit/s) as an interface, and converts it to a signal having a wavelength defined by ITU-T with OTU (optical transport unit)-2 (10.7 Gbit/s) defined by Document 5 to output it to the WDM unit. The IF unit 23 has the function of performing reverse conversion of the signal from the WDM unit. The IF unit 23 has the function of regeneration repeating the OTU-2 signal with respect to a signal transferred by the node from one transmission path to the other.

The IF unit 23 can also accommodate, as a client signal, GbE (Gigabit Ethernet) (1 Gbit/s), and 10 GbE (10.3 Gbit/s). The interface speed between the IF unit 23 and the WDM unit is obtained by adding, to these, about 7%, an error correction code percentage. The error correction code percentage can be increased according to necessary correction ability.

The WDM unit 24 wavelength-multiplexes outputs from the IF units 23, when necessary amplifies, and transmits to a transmission path fiber. The WDM unit 24 demultiplexes the wavelength-multiplexed signal from the transmission path fiber and transmits to the IF units 23. The WDM unit 24 has the function of, when necessary, amplifying the optical signal before or after being subjected to wavelength-demultiplexing, before transmission to the IF units 23, and wavelength-multiplexing/wavelength-demultiplexing an optical supervisory signal (monitoring light) onto/from main signal light.

The optical power when the WDM unit 24 performs transmission on the transmission path fiber is determined in consideration of waveform deterioration and noise increase due to loss between the nodes, an optical signal-to-noise ratio (OSNR) based on a noise figure of the optical amplifier, and the nonlinear effect in the fiber. As the nonlinear effect, self phase modulation (SPM), cross phase modulation (XPM), and four wave mixing (FWM) have been known. The amount of waveform deterioration depends on the number of wavelengths, fiber dispersion, input power to a fiber, and a nonlinear constant. The fiber dispersion and the nonlinear constant are different depending on whether the fiber is a single mode fiber (SMF) or a dispersion shifted fiber (DSF). Individual differences between the DSFs exist. An output power of the amplifier before transmission to the IF unit 23 is determined in consideration of the dynamic range and the reception sensitivity of the receiver. A dispersion compensator which cancels waveform deterioration due to chromatic dispersion of the fiber may be incorporated into the WDM unit 24. There is sold the dispersion compensators which use a dispersion compensation fiber in which the positive and negative codes are different from those of the transmission path fiber, a fiber diffraction grating, an optical lens, and a resonator.

The device monitoring control unit 21 has a communication control unit 211 communicating with the network management system and the switch unit 22, the IF unit 23, and the WDM unit 24 of the node 20, a CPU 212, a configuration management information storing unit 213, a fault management information storing unit 214, a performance management information storing unit 215, and a switching management information storing unit 216.

The switch unit 22 has a communication control unit 221 communicating with the device monitoring control unit 21, the IF unit 23, and the WDM unit 24 of the node 20, a CPU unit 222, a switching status unit 223, a performance information unit 224, a fault information unit 225, a driving control unit 226, and a switch unit 227.

The WDM unit 24 may be divided into a wavelength multiplexing unit and a wavelength demultiplexing unit. The IF unit 23 may be divided into an input IF and an output IF.

Figure 3:
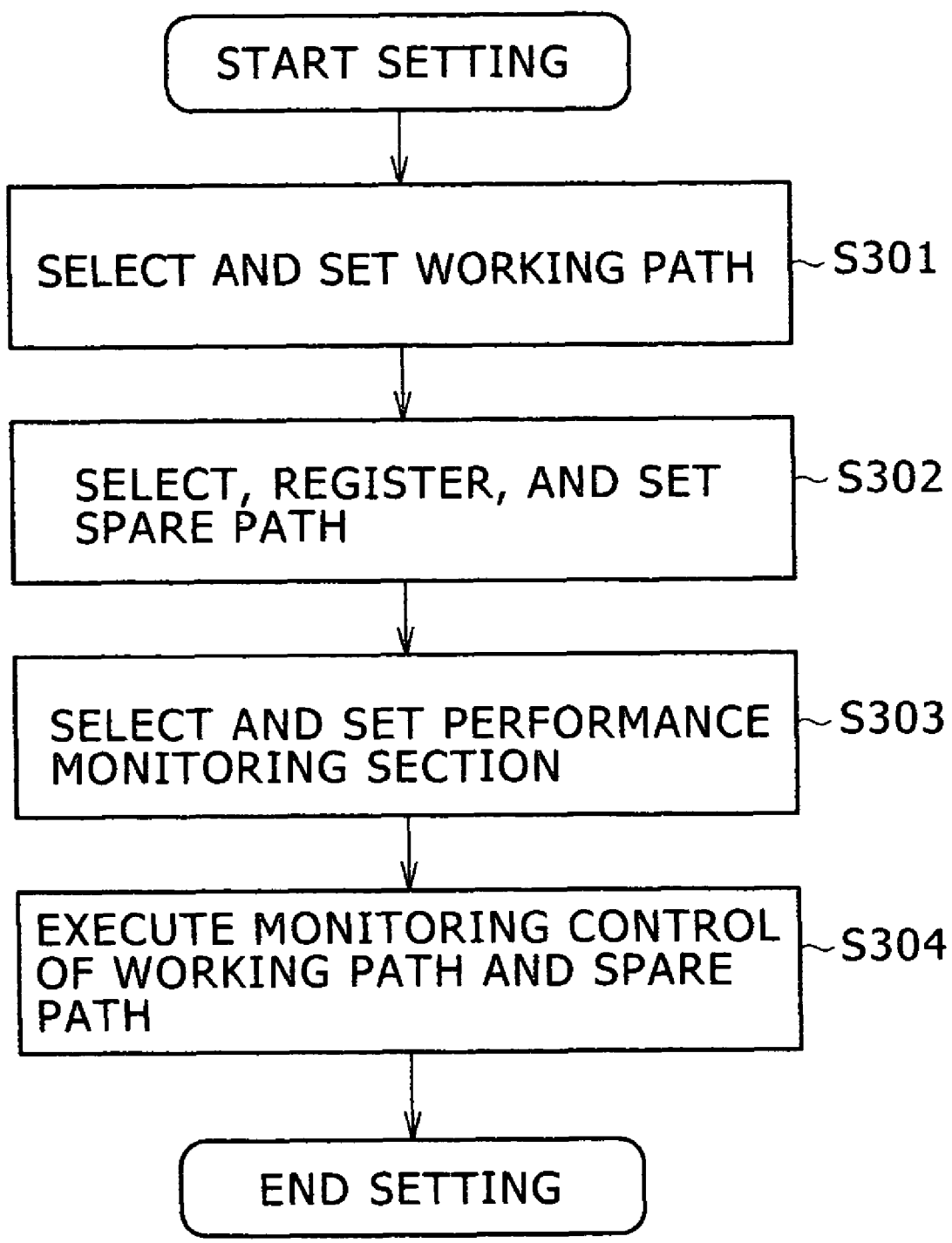
FIG. 3 is a path setting flowchart.

Using FIG. 3, a procedure of setting an optical path when a circuit recovery method is applied to the optical network will be described. FIG. 3 is a path setting flowchart. The network management system 40 searches for a working path between desired nodes. The operator or the network management system according to a desired rule selects one of plural candidates (S301). When the working path is decided, the network management system searches for and sets a spare path (S302) and sets a fault monitoring section between nodes switching to the spare path (S303). Monitoring control of both the working path and the spare path is executed (S304).

As described in Document 1, in the spare path setting method, a working path is divided into plural partial working path sections to assign a spare path to each of the segmented path sections, thereby permitting efficient preliminary resource utilization and rapid circuit recovery. To perform efficient and simple path setting, a working path is selected so that the number of nodes forming the path is minimum. A spare path as a bypass is shared between plural working paths. It is effective to perform switching-back.

As a method of monitoring a fault between switching nodes, TCM can be used. When TCM is used, the IF unit 23 calculates the number of bit errors by BIP by processing with an electronic circuit after optical/electrical (O/E) conversion. The threshold value incorporated into the IF unit 23 or instructed from the network management system is compared with the number of bit errors. The IF unit 23 judges the number of errors per unit time exceeding the threshold value as being at fault to generate an alarm to the network management system 40 via the device monitoring control unit 21. The network management system 40 uses this as a switching trigger to perform switching to a spare path for performing line reliving.

In switching to the spare path, the device monitoring control unit 21 of each of the nodes may store switching information based on spare path calculation from the network management system 40, perform switching to the spare path by signaling which uses main signal overhead between the nodes with the generated alarm as a trigger, transfer the result to the network management system 40. A bidirectional path or a unidirectional path may be used. For the bidirectional path, a different fiber may be used in each direction or bidirectional transmission may be performed on the same fiber.

Figure 4:
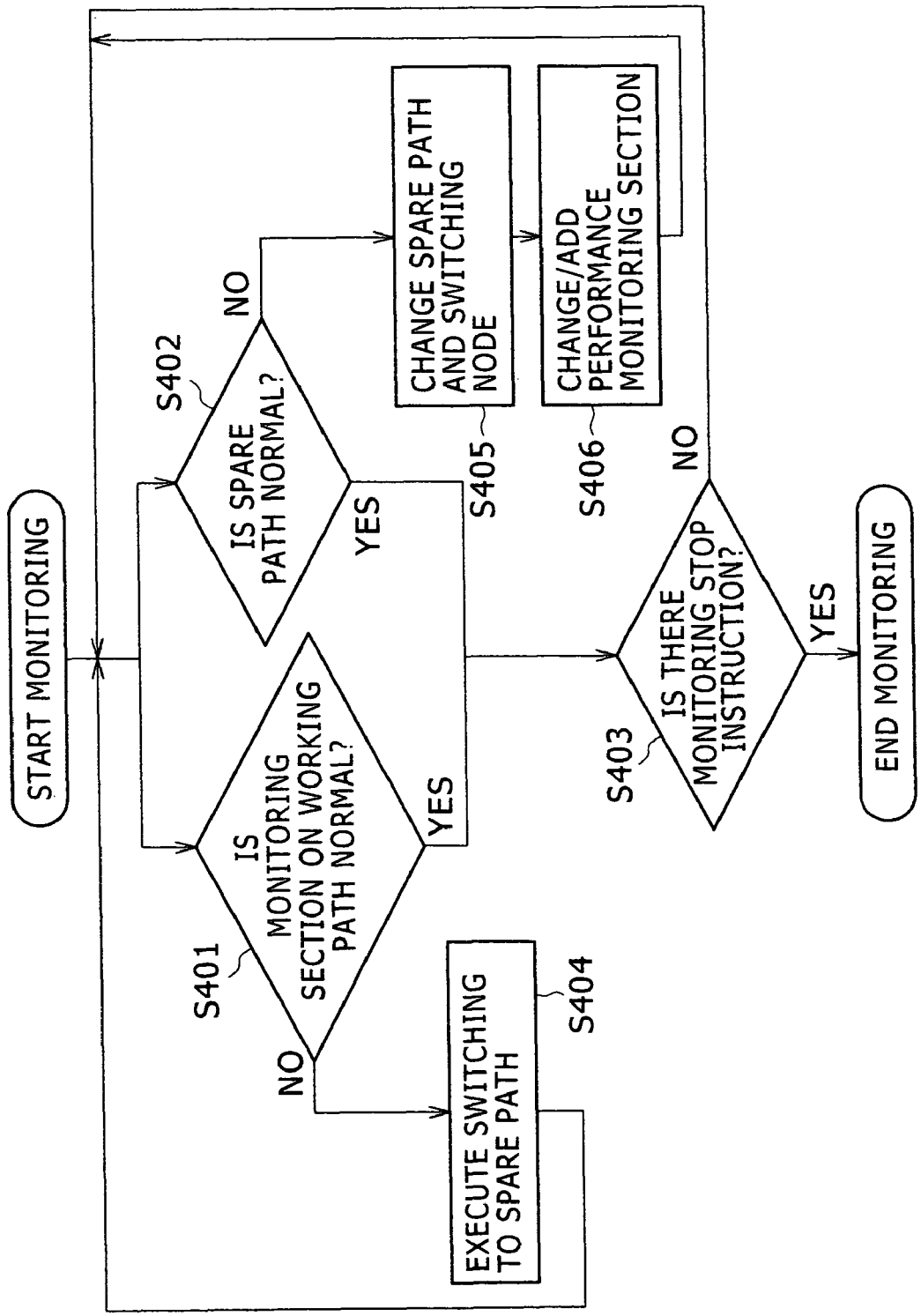
FIG. 4 is a flowchart of assistance in explaining path monitoring.

A procedure of a circuit recovery method will be described using FIGS. 4 to 7. FIG. 4 is a flowchart of assistance in explaining path monitoring executed by the network management system. In FIG. 4, under normal conditions, the network management system 40 judges both normal judgment of a monitoring section on a working path (S401) and normal judgment on a spare path (S402) as being Yes. Unless there is a monitoring stop instruction (S403), S401 and S403 or S402 and S403 are repeated. In the case of No (the monitoring section of the working path is abnormal) in S401, the network management system 40 performs switching to the spare path (S404).

By this switching, the working path (the initial spare path) becomes normal, and the spare path (the initial working path) is abnormal. The response in S402 is No. Change of the spare path and the switching node (S405) and change/addition of the performance monitoring section (S406) are executed. The spare path is allowed to be shared between plural segmented path sections. Specified spare path setting is not always done to the switch of the node on the spare path. The spare path is monitored on each link not including switch setting between adjacent nodes. This can also be done by temporarily controlling the switch unit to be performed through plural links between the switching nodes on the spare path and all nodes.

Figure 5A:
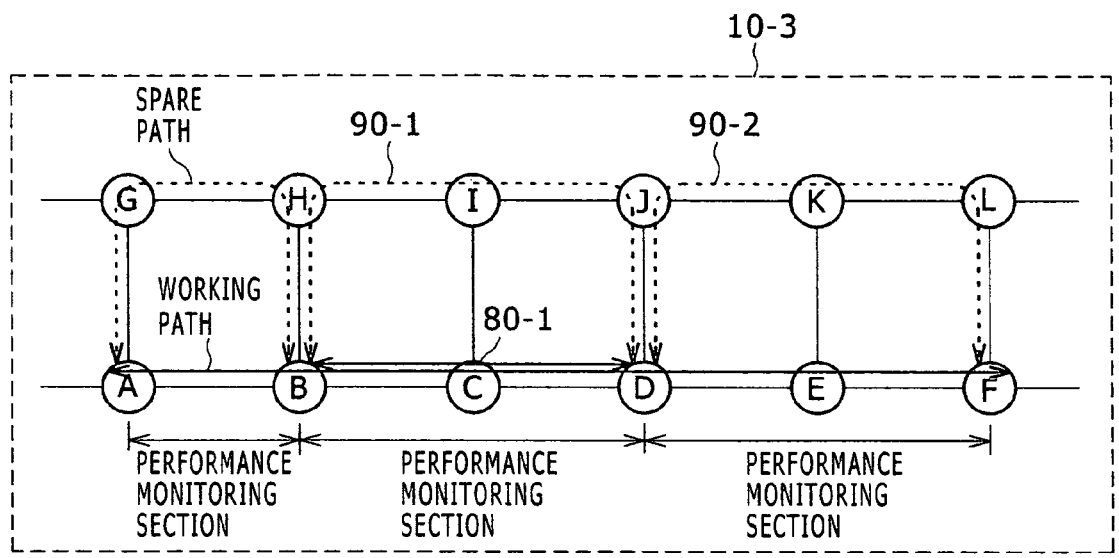
FIGS. 5A and 5B are block diagrams of assistance in explaining working path and spare paths.
Figure 5B:
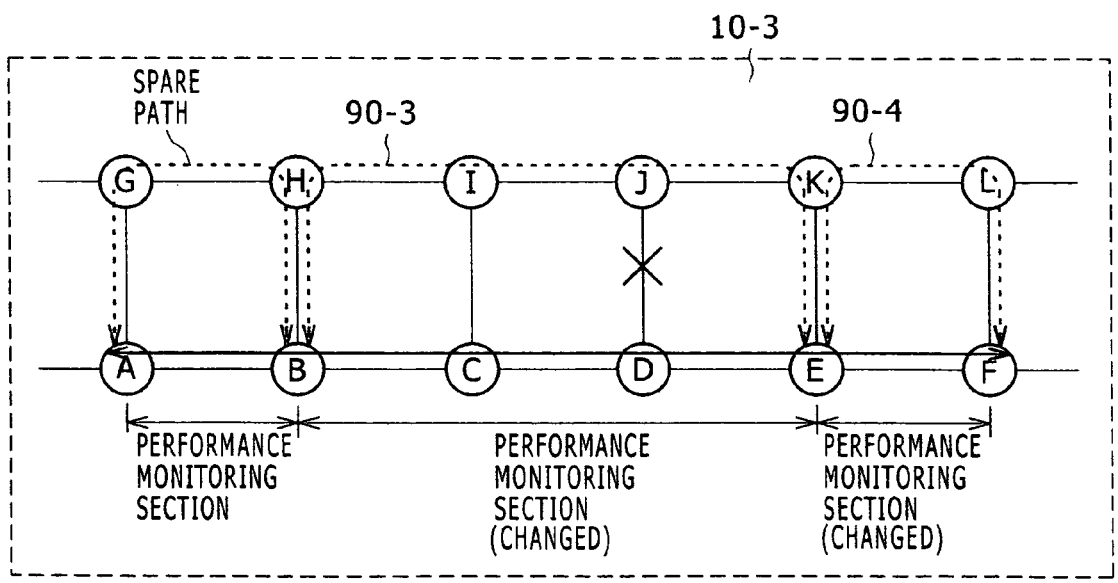

The case of spare path abnormality will be described using FIGS. 5A and 5B. FIGS. 5A and 5B are block diagrams of assistance in explaining a working path and spare paths. In FIG. 5A, a suitable spare path 90-1 (B-H-I-J-D in FIG. 5A) is set to a currently-used segmented path section 80-1 (B-C-D in FIG. 5A). In FIG. 5B, the network management system 40 detects abnormality (J-D) on a spare path while a working path is normal. The network management system 40 prepares another spare path to rapidly perform circuit recovery when the normal path is abnormal. Specifically, the network management system 40 performs spare path re-search based on the latest configuration information, fault information, and performance information to set another spare path 90-3 (B-H-I-J-K-E). The network management system 40 decides the switching nodes (node B and node E). The network management system 40 changes the fault monitoring section along with change of the switching nodes (from B-C-D in FIG. 5A to B-C-D-E in FIG. 5B).

At change of the fault monitoring section, the network management system 40 performs alarm prevention processing concerning TCM of the signal from node E to node B in FIGS. 5A and 5B of bidirectional signals at node B on the reception side of TCM byte. The network management system 40 then changes the transmission side nodes E to D to release alarm prevention of the reception side node for starting monitoring of a new fault monitoring section. This can prevent erroneous alarm generation, unnecessary switching at change of the fault monitoring section, and interruption of the currently-used line along therewith. There is described here the case that when the switching nodes are the nodes B and D, a fault occurs at the nodes J-D. The same is true for the switching nodes D-F sharing the nodes J-D as a spare path. In this case, the switching nodes D-F are changed to the nodes E-F and the fault monitoring section is changed from D-F to E-F.

Monitoring in the fault monitoring section is performed between the switching nodes on the working path using an optical path. Monitoring in the fault monitoring section is performed on the spare path by error detection on each link between nodes forming the spare path when connection setting at the nodes is not performed before a fault occurs. When connection setting at the nodes is performed on the spare path, monitoring may be performed by error detection between the switching nodes. The network management system 40 collects monitoring information from the devices. The network management system 40 accumulates monitoring information on plural links forming the spare path to monitor the fault monitoring section of the spare path.

Figure 6A:
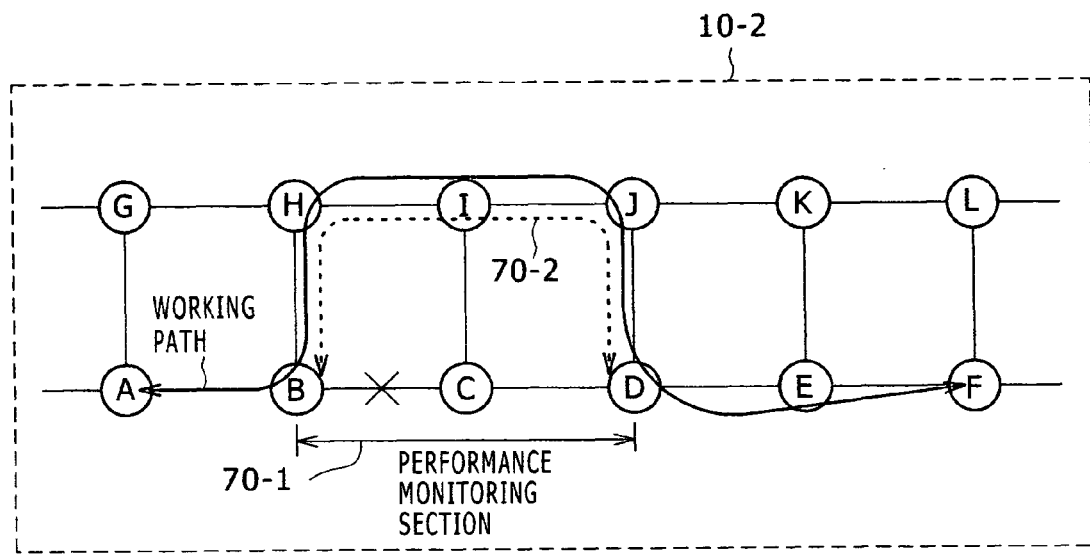
FIGS. 6A and 6B are block diagrams of assistance in explaining path reset.
Figure 6B:
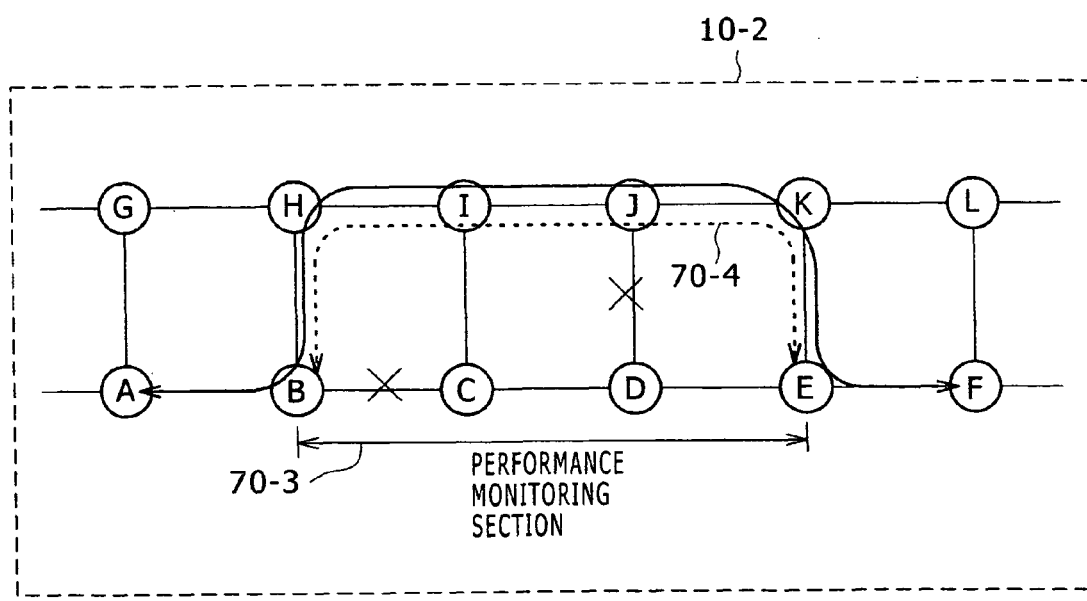

The case that abnormality is detected in the currently-used segmented path section will be described using FIGS. 6A and 6B. FIGS. 6A and 6B are block diagrams of assistance in explaining path recovery. In an optical network 10-2 shown in FIG. 6A, the network management system 40 maintains setting of a fault monitoring section 70-1 (B-C-D) in an old currently-used segmented path section in which a fault is detected, executes switching to the newest spare path, and sets a fault monitoring section 70-2 (B-H-I-J-D) on the switched path (old spare path). A recovery check signal is flowed to the fault monitoring section 70-1 (B-C-D). The recovery check signal may be a special bit string or may be a typically used alarm notification signal to the downstream. This can judge in real time based on the number of bit errors that the old working path section is normally returned and rapid and reliable switching-back can be executed. On switching-back, the network management system 40 detects normal return check to visualize and notify it to the operator. The operator may judge it to execute the switching-back operation. The operator may set a suitable condition to the network management system 40 and the device monitoring control unit 21 to automatically execute it after normal return check.

Referring to FIG. 6B, when a fault is detected in the nodes J-D after path switching in FIG. 6A, switching to the newest spare path is executed to change the fault monitoring section 70-1 (B-C-D) in the old currently-used segmented path section to a fault monitoring section 70-3 (B-C-D-E) to set a fault monitoring section 70-4 (B-H-I-J-K-E) to the switched path. The recovery check signal is flowed to the fault monitoring section 70-3 (B-C-D-E). This can judge in real time based on the number of bit errors that the old working path section is normally returned. Rapid and reliable switching-back can be executed.

In FIGS. 5A, 5B, 6A, and 6B, the network management system judges switching to the spare path and switching-back to the old working path. As described above, the device monitoring control units of the nodes may judge them.

Referring to FIGS. 7A and 7B, a path table owned by the network management system will be described. FIG. 7A is a diagram of assistance in explaining change of a path table due to spare path abnormality of FIGS. 5A and 5B. FIG. 7B is a diagram of assistance in explaining change of a path table due to working path abnormality of FIG. 6A.

In FIG. 7A, a path table 200A has path information 210, segmented path information 220, and spare path information 230. The path information 210 has a path ID 211, a start node 212, and an end node 213. The path of "00000001" of the path ID is a path between the nodes A and F. The path has plural segmented paths. The segmented path information 220 includes a segmented path ID 221, a start node 222, an end node 223, and a relay node 224. The nodes are described in order to define plural links of the segmented paths. The segmented path information 220 further includes performance monitoring 225, a segmented path status 226, and the number of spare paths 227. The status described to the segmented path status 226 is any one of "active", "standby", and "fault". When a segmented path is active, it is selected as a working path. When a segmented path is at fault, it has a fault. When a segmented path is on standby, it has no fault and is not selected as a working path. When the performance monitoring 225 is ON, performance evaluation as the entire segmented path is executed. When the segmented path status is active, the performance monitoring 225 is ON. The number of spare paths 227 with respect to the segmented path is described. Here, for simplification, it is 1 in all cases.

The spare path information 230 has a spare path ID 231, a relay node 232, a priority order 233, performance monitoring 234, and a spare path status 235. Since the number of spare paths is 1 in all cases, all the priority orders 233 indicate 1. The spare path status 235 is any one of "active", "standby", "fault", and "deactive". The statuses "active", "standby", and "fault" are described in the same manner as the segmented path. The status "deactive" is the status of a spare path when a segmented path corresponding to the spare path is in the "standby" status.

In FIG. 7A, the left status of "→" is the status selecting the performance monitoring section of FIG. 5A, and the right status of "→" is the status selecting the performance monitoring section of FIG. 5B. When a fault occurs in the nodes J to D shown in FIG. 5B, the spare path status 235 of the spare path IDs "s0002. 001" and "s0003. 001" of the spare paths using the nodes J-D of FIG. 7A is at fault. The segmented path IDs "s0002" and "s0003" which have lost the spare path are changed from active to standby. The segmented path IDs "s0004" and "s0005" are changed from standby to active. The spare path status 235 of the corresponding spare path IDs "s0004. 001" and "s0005. 001" are changed from deactive to standby. The performance monitoring 225 of the segmented path information 220 is switched between on and off according to the segmented path status 226.

In FIG. 7B, the left status of "→" is a path table before a fault occurs in the working path in FIG. 6A, and the right status of "→" is a path table after a fault occurs in FIG. 6A. When a fault occurs in the nodes B-C shown in FIG. 6A, the segmented path status 226 of the segmented path ID "s0002" using the nodes B-C of FIG. 7B is changed from active to fault. The spare path status 235 of the corresponding spare path ID "s0002. 001" along therewith is changed from standby to active. The performance monitoring 234 is changed from OFF to ON. The performance monitoring 225 of the segmented path ID "s0002" is not changed to OFF and continues to be ON. The performance monitoring 225 can continues to be ON because the switching status of the nodes on the spare path is unstable and the switching status of the middle node on the working path is held. When switching setting of the start node and the end node is changed, connection of the start node and the end node is maintained. The start node B and the end node D transmit the recovery check signal to the fault path to continue performance monitoring of the nodes B-D. According to this embodiment, the performance monitoring can detect recovery. The switching back to the old working path as the simplest configuration can be easily done.

The line reliving method is not limited to the above embodiment. In the above embodiment, the network management system performs fault monitoring section setting to nodes, instruction of switching to a spare path, and spare path calculation. It is clear that the same is true for fault monitoring section setting, spare path calculation, and instruction of switching to a spare path performed based on information exchange by mutual communication of the device monitoring control units, as described in FIG. 1. Spare path calculation may be based on a routing protocol called OSPF (open shortest path first) discussed in IETF.

In the above embodiment, the fault monitoring method using TCM of Document 5 is described. The network management system may collect monitoring bytes (B2 bytes) of section overhead of SDH and performance monitoring information on each link by an OTUk section monitor of OTN, compute signal quality between predetermined nodes, and compare it with the threshold value to judge fault occurrence. The network configuration of FIGS. 5A, 5B, 6A, and 6B is an optical network in which the nodes are connected by three-way or more transmission path, the same effect can be expected. A two-way path may be used at the end node.

According to this embodiment, a fault monitoring section can be changed without causing an erroneous alarm and unnecessary switching. A high-reliable optical network by flexible spare path setting can be provided.

A spare path may be calculated after abnormality occurs, may be calculated, before abnormality occurs, based on information collected cyclically or immediately before abnormal occurrence, to be stored in the network management system, or may be delivered to the device monitoring control unit to be stored in the switching monitoring information storing unit shown in FIG. 2. In the latter, line reliving processing time or spare path prepare time for line reliving after a fault occurs can be shortened. The reliability or downtime of the network can be improved.

The trigger of switching to a spare path is fault detection in a currently-used segmented path section. For fault transfer and preventive maintenance, the operator may start switching to a spare path. As the trigger resetting a spare path and a fault monitoring section, the example of fault detection of an expected spare path is shown. The effect of this embodiment is not limited to this. A spare path has been already used for reliving a working path protected by another currently-used segmented path section and another line reliving method. Switching at switching nodes expected for reliving a currently-used segmented path cannot be done. The network management system or the device monitoring controller detects this by updating configuration management information to change a combination of spare paths and switching nodes. In such case, the effect of this embodiment is the same.

The switch unit of FIG. 1 or 2 may be an electric switch. As an optical switch, an optical waveguide movable optical switch, an optical waveguide non-movable optical switch, and a micro machine optical switch can be used.

The working path in this application means a path being currently used or an absolute path. Those skilled in the art can easily understand distinguishing between the uses of them.

According to the optical network, the node apparatus, and the path fault reliving method of the present invention, recovery to the normal status of a partial working path in which a fault occurs can be checked. Rapid and reliable switching-back can be realized.

We claim:

1. An optical network comprising:
a first node including a switch unit and connected to communication paths, a second node including a switch unit and connected to communication paths for communicating with said first node, a third node including a switch unit and connected to communication paths for relaying communication of said first node and said second node, and a fourth node including a switch unit and connected to communication paths for relaying communication of said first node and said second node, and a network management system connected to a plurality of nodes including said first node, said second node, said third node, and said fourth node, thereby forming a communication path;
wherein said network management system performance-monitors a first performance monitoring section on a working path between said first node and said third node, and performance-monitors a second performance monitoring section on said working path between said third node and said second node;
wherein said network management system monitors links of a first spare path as a bypass between said first node and said third node, and a second spare path as a bypass between said third node and said second node; and
wherein when detecting that a fault has occurred between said third node and an adjacent node, which are included in at least one of said first spare path and said second spare path, said network management system sets a third spare path which connects said fourth node but does not include an area between said third node and said adjacent node, and performance-monitors a third performance monitoring section between said first node and said fourth node and a fourth performance monitoring section between said fourth node and said second node.

2. A node apparatus connected to a first communication path and a second communication path, comprising:
a wavelength separation unit that separates a wavelength-multiplexed signal received from said first communication path or said second communication path;
an input interface unit that monitors an optical signal separated by said wavelength separation unit or an optical signal received from a client device thereunder and transmits said optical signal to a switch unit;
said switch unit that performs path setting of the optical signal from said input interface unit;
an output interface unit that transmits the optical signal from said switch unit to a wavelength multiplexing unit or the client device;
the wavelength multiplexing unit that wavelength-multiplexes the optical signal from said output interface unit for output to said first communication path or said second communication path; and
a device monitoring control unit;
wherein when said device monitoring control unit detects a fault from the signal received from said first communication path, said device monitoring control unit directs the optical signal to said second communication path instead of said first communication path, and transmits a recovery check signal to said first communication path;
wherein when detecting that the signal received from said first communication path has been recovered, said device monitoring control unit switches to said first communication path from said second communication path.

3. A node apparatus connected to a first communication path, and a second communication path, and a third communication path, comprising:
a wavelength separation unit that separates a wavelength-multiplexed signal received from said first communication path, said second communication path, or said third communication path;
an input interface unit that monitors an optical signal separated by said wavelength separation unit or an optical signal received from a client device thereunder and transmits said optical signal to a switch unit;
said switch unit that performs path setting of the optical signal from said input interface unit;

an output interface unit that transmits the optical signal from said switch unit to the client device or a wavelength multiplexing unit that wavelength-multiplexes the optical signal from said output interface unit for output to said first communication path, said second communication path, or said third communication path; and a device monitoring control unit that communicates with a network management system to control said node apparatus;

wherein when detecting a fault from the signal received from said first communication path, said device monitoring control unit gives notification to said network management system, said network management system which has received the notification performs changes to said first communication path, to said second communication path, to said third communication path, and to a section to be monitored.

4. A node apparatus of claim 3,
wherein said first communication path and said second communication path are at least portions of a spare path, and said third communication path is at least a portion of a working path.

5. A node apparatus of claim 3,
wherein said first communication path and said second communication path are at least portions of a working path, and said third communication path is at least a portion of a spare path.

6. A path fault relieving method at a node apparatus connected to a first communication path and a second communication path, comprising the steps of:

separating a wavelength-multiplexed optical signal received from said first communication path or said second communication path;

monitoring the separated optical signal or an optical signal received from a client device thereunder;

transmitting the monitored optical signal to a switch unit;

performing path setting for the transmitted optical signal;

transmitting the optical signal to a wavelength multiplexing unit;

wavelength-multiplexing the transmitted optical signal for output to said first communication path or said second communication path;

when detecting a fault from the signal received from said first communication path in said monitoring step, switching to said second communication path as a working path;

transmitting a recovery check signal to said first communication path;

detecting recovery from the signal received from said first communication path; and switching back to said first communication path as the working path.

7. A path fault relieving method at a node apparatus connected to a first communication path and a second communication path as working paths and a third communication path as a spare path, comprising the steps of:

separating a wavelength-multiplexed optical signal received from said first communication path, said second communication path, or said third communication path;

monitoring the separated optical signal or an optical signal received from a client device thereunder;

transmitting the monitored optical signal to a switch unit;

performing path setting for the transmitted optical signal;

transmitting the optical signal to a wavelength multiplexing unit;

wavelength-multiplexing the transmitted optical signal for output to said first communication path, said second communication path, or said third communication path; and when detecting a fault from the signal received from said third communication path in said monitoring step, transmitting a message requesting change of a performance monitoring section and change of the spare path to a network management system.

8. A node apparatus connected to a first communication path and a second communication path, comprising:

a wavelength separation unit that separates a wavelength-multiplexed signal received from said first communication path or said second communication path;

an input interface unit that monitors an optical signal separated by said wavelength separation unit or an optical signal received from a client device thereunder and transmits said optical signal to a switch unit;

said switch unit that performs path setting of the optical signal from said input interface unit;

an output interface unit that transmits the optical signal from said switch unit to a wavelength multiplexing unit or the client device;

the wavelength multiplexing unit that wavelength-multiplexes the optical signal from said output interface unit for output to said first communication path or said second communication path; and a device monitoring control unit;

wherein when said device monitoring control unit detects a fault from the signal received from said first communication path, said device monitoring control unit directs the optical signal to said second communication path instead of said first communication path, and transmits a recovery check signal to said first communication path;

wherein said first communication path originally comprises at least a portion of a working path, and said second communication path originally comprises at least a portion of a spare path; and wherein when said device monitoring control unit directs the optical signal to said second communication path, said first communication path ceases to comprise at least a portion of a working path, and instead said second communication path comprises at least a portion of a working path.

* * * * *